(12) United States Patent
Salvucci

(10) Patent No.: US 9,578,335 B2
(45) Date of Patent: Feb. 21, 2017

(54) MULTI-COMPATIBLE LOW AND HIGH DYNAMIC RANGE AND HIGH BIT-DEPTH TEXTURE AND VIDEO ENCODING SYSTEM

(71) Applicant: Trellis Management Co., Ltd., San Rafael de Escazu (CR)

(72) Inventor: Emanuele Salvucci, Rome (IT)

(73) Assignee: Trellis Management Co., Ltd., San Rafael de Escazu (CR)

( * ) Notice: Subject to any disclaimer, the term of this patent is extended or adjusted under 35 U.S.C. 154(b) by 0 days.

(21) Appl. No.: 14/618,069

(22) Filed: Feb. 10, 2015

(65) Prior Publication Data

US 2015/0189286 A1   Jul. 2, 2015

Related U.S. Application Data

(60) Continuation of application No. 13/913,797, filed on Jun. 10, 2013, now Pat. No. 9,058,639, which is a continuation of application No. 13/532,849, filed on Jun. 26, 2012, now Pat. No. 8,462,194, which is a division of application No. 12/002,058, filed on Dec. 14, 2007, now Pat. No. 8,237,865.

(60) Provisional application No. 60/920,053, filed on Mar. 26, 2007, provisional application No. 60/870,509, filed on Dec. 18, 2006.

(51) Int. Cl.

| | | |
|---|---|---|
| *H03M 1/12* | (2006.01) |
| *H04N 5/445* | (2011.01) |
| *G09G 5/02* | (2006.01) |
| *H04N 19/136* | (2014.01) |
| *G06T 9/00* | (2006.01) |
| *H04N 19/61* | (2014.01) |
| *H04N 19/186* | (2014.01) |
| *H04N 19/44* | (2014.01) |
| *H04N 19/65* | (2014.01) |

(52) U.S. Cl.
CPC ............. *H04N 19/136* (2014.11); *G06T 9/00* (2013.01); *G06T 9/001* (2013.01); *H04N 19/186* (2014.11); *H04N 19/44* (2014.11); *H04N 19/61* (2014.11); *H04N 19/65* (2014.11)

(58) Field of Classification Search
CPC ... H04N 19/136; H04N 19/44; H04N 21/4854
USPC ................................ 348/572, 563; 345/590
See application file for complete search history.

(56) References Cited

U.S. PATENT DOCUMENTS

| | | | |
|---|---|---|---|
| 4,329,708 A | 5/1982 | Yamamoto et al. |
| 4,719,503 A | 1/1988 | Craver et al. |
| 5,341,442 A | 8/1994 | Barrett |
| 5,430,482 A | 7/1995 | Kim |
| 5,754,456 A * | 5/1998 | Eitan ............... G06F 9/30014 |
| | | | 708/401 |
| 6,353,823 B1 * | 3/2002 | Kumar .............. G06F 17/30067 |
| 7,945,102 B2 | 5/2011 | Kondo |
| 2001/0026616 A1 * | 10/2001 | Tanaka ................. G06T 1/0028 |
| | | | 380/202 |

(Continued)

*Primary Examiner* — Pankaj Kumar
*Assistant Examiner* — Franklin Andramuno
(74) *Attorney, Agent, or Firm* — Buchanan Nipper

(57) ABSTRACT

A method of processing image data includes generating image data including luminance and chrominance data representing a selected object, separating the luminance and chrominance data, storing the separated luminance and chrominance data in corresponding separate spaces in memory, and separately compressing the stored luminance and chrominance data.

16 Claims, 10 Drawing Sheets

(56) References Cited

U.S. PATENT DOCUMENTS

| | | | |
|---|---|---|---|
| 2001/0033286 A1* | 10/2001 | Stokes | H04N 1/64 345/590 |
| 2002/0049970 A1* | 4/2002 | Park | H04H 40/18 725/39 |
| 2003/0007101 A1 | 1/2003 | Kumazawa | |
| 2006/0061845 A1* | 3/2006 | Lin | H04N 5/2355 358/540 |
| 2007/0081734 A1* | 4/2007 | Sullivan | G06F 17/147 382/250 |
| 2007/0201560 A1* | 8/2007 | Segall | H04N 19/61 375/240.24 |
| 2007/0269115 A1 | 11/2007 | Wang et al. | |
| 2008/0101455 A1* | 5/2008 | Scheelke | H04N 21/4821 375/240.01 |

* cited by examiner

MULTI-COMPATIBLE LOW AND HIGH DYNAMIC RANGE AND HIGH BIT-DEPTH TEXTURE AND VIDEO ENCODING SYSTEM

CROSS-REFERNCE TO RELATED APPLICATIONS

This is a continuation of U.S. Ser. No. 13/913,797, filed Jun. 10, 2013, which is a continuation of U.S. Ser. No. 13/532,849, filed Jun. 26, 2012, now U.S. Patent No. 8,462, 194, issued Jun. 11, 2013, which is a divisional of U.S. Ser. No. 12/002,058, filed Dec. 14, 2007, now U.S, Patent No. 8,237,365, issued Aug. 7, 2012, which claims benefit of U.S. Provisional No. 60/920,053, filed Mar. 26, 2007 and 60/870, 509, filed Dec. 18, 2006. The entire contents of those applications are incorporated herein by reference.

FIELD OF INVENTION

The present invention relates to digital image processing and, more particularly, to encoding and decoding low dynamic range (LDR), high dynamic range (HDR) and High Bit-depth Images, including video compression.

BACKGROUND OF INVENTION

High Dynamic Range Imagery (HDRI) refers to processes, techniques, and digital image systems capable of reproducing real-world lighting and color data with high accuracy. HDRI initially was introduced to overcome dynamic range limitations in digital images, such as described in the scientific publication "Overcoming Gamut and Dynamic Range Limitations in Digital Images" (hereinafter "Ward98_2"), Proceedings of the Sixth Color Imaging Conference, November 1998, as well as in the scientific publication "High Dynamic Range Imagery" (hereinafter "Ward01"), Proceedings of the Ninth Color Imaging Conference, November 2001

HDR pixel data commonly is represented using 96 bit data; 32 bits single precision IEEE floating point data for each RGB component. Standard digital images usually employ 24 bits per pixel; 8 bits for each RGB component. Thus, an HDR image has four times as much data as an LDR image. Therefore, due to relatively large amount of data for an HDR image, there is a need to substantially compress HDR image data.

The publication G. Ward, "Reel Pixels," Graphics Gems II, Ed. by J. Arvo, Academic Press, 1992 (hereinafter "Ward92"), describes the RGBE image format as representing the required dynamic range using 32 bits/pixel instead of 96 bits/pixel, providing a compression ratio of 3:1. Typical image and video compression algorithms, such as JPEG and MPEG, achieve much higher compression ratios, thus producing files hundreds of times smaller than the original source data. The RGBE format explicates a relevant compression problem by introducing the Exponent on a per-pixel basis, since even small errors that may be introduced by common compression methods, such as but not limited to JPEG and MPEG, generate exponentially higher levels of artifacts in the recovered image.

European Patent EP 0991020, owned by the Eastman Kodak Company, (hereinafter, "Kodak Patent") describes a method to encode the extended color gamut of sRGB images by using residual images obtained by computing The scientific publication "Perception-motivated High Dynamic Range Video Encoding", Proc. of SIGGRAPH '04 (Special issue of ACM Transactions on Graphics), 2004 (hereinafter "Mantiuk04") describes a method to encode HDR video into the MPEG4 standard. As described, the chrominance part of the image is expressed using a u'v' color space similar to the color space used in the LogLuv image format discussed in Larson, G. W., "LogLuv encoding for full-gamut, high-dynamic range images," Journal of Graphics Tools, 3(1):15-31 1998 (hereinafter "Ward98"), and also describes using 11 bits to store luminance data directly into the DCT coefficients. To overcome visible artifacts due to the augmented DCT range, a hybrid block coding system using additional data also is introduced The scientific publication "High Dynamic Range Image and Video Data Compression", IEEE CG&A, 2005 (hereinafter "Xu05") describes a method to encode HDR image/video data, where, considering the RGBE image format, the RGB part of the image and the "E" (Exponent) part are separated and sent to different compression schemes. As described, the compression scheme for RGB is lossy while the scheme for "E" is lossless.

The publications "Subband Encoding of High Dynamic Range Imagery", First Symposium on Applied Perception in Graphics and Visualization (APGV), August 2004, (hereinafter "Ward04") and "JPEG-HDR: A Backwards-Compatible, High Dynamic Range Extension to JPEG", Proceedings of the Thirteenth Color Imaging Conference, November 2005, (hereinafter "Ward05") describe methods/systems for encoding HDR images and video in which a tone mapping operator is applied to the HDR source so that the HDR input is mapped smoothly into a 24 bit output domain with no components being clamped at 0 or 255. The original luminance of the HDR image is divided by the luminance of the tone-mapped LDR version, generating an HDR grayscale residual image which is log-encoded and used to restore the original frame.

The scientific publication "Backward Compatible High Dynamic Range MPEG Video Compression", Proc. of SIGGRAPH '06 (Special issue of ACM Transactions on Graphics), 25 (3), pp. 713-723, 2006, (hereinafter "Mantiuk06") discloses a method for compressing HDR video similar to that disclosed in Ward04 and Ward05.

The processes and techniques disclosed in each of the publications identified above disadvantageously call for additional coding and additional per-pixel operations, as well as additional pre- and/or post-correction processing, to achieve satisfactory results. Moreover, currently available MPEG and/or MPEG4 features and filters cannot be fully and/or easily exploited or employed by, or are incompatible with, many of the processes/systems mentioned above.

Consumer digital displays today are only capable of displaying 8 bits for each RGB color component (i.e. 24-bit image data) and, considering luma/chroma separation, are only capable of displaying 8 bits for luma data that contain the high-frequency details of an image. With the introduction of high definition (HD) resolutions and bigger display screens—up to 100 inches—the limited precision of standard 24-bit digital images reveals several artifacts on such displays, even when uncompressed. By employing common compression solutions, like the JPEG or MPEG plethora of algorithms, these artifacts become even more visible to the human eye, due to the reduced precision, in number of bits, of the resulting decompressed output image.

In order to fully exploit the potential of HD resolutions, a display should be capable of showing 1920 shades, i.e. the maximum number of pixels in the longest pixel row at the highest HD resolution (1080p). With 8-bit data it is only possible to display 256 shades and moreover with MPEG compression this figure is usually greatly reduced, producing visible banding artifacts when using HD resolutions even on a 26 inches display. MPEG—and the latest H.264 standard—also introduces block-artifacts due to the nature of the algorithms which encode and store image data in blocks of 4×4 pixels up to 16×16 pixels, which are independent from each other, i.e. the output pixel luma value of a block has no correlation with an adjacent pixel of a different block. This usually leads to a high luminance contrast between edges of the surrounding blocks.

In order to avoid block-artifacts a number of algorithms commonly known as "deblocking filters" have been introduced. Such algorithms though are by nature very expensive in terms of the computing power required, which is linearly related to the dimensions of the image to be filtered. With HD resolutions, the number of pixels to be processed with a deblocking filter is up to 4.6 times the number of pixels being processed in a standard PAL or NTSC frame, thus a deblocking algorithm requires much more computing power in order to be applied to HD resolutions.

Hence, there is also a need to provide an effective method that enables encoding and decoding of higher precision image data (>24 bits/pixel) that is compatible with standard compression methods, such as JPEG and MPEG, and for a method that is able to remove typical image compression artifacts using the lowest possible computing power.

SUMMARY OF INVENTION

In view of the foregoing, it is an object of the present invention to provide simple, efficient and practical HDR and High Bit-Depth image and video encoding techniques that are both compatible with and can fully exploit existing compression algorithms, including the JPEG and MPEG standards.

It is a further object of the present invention to provide HDR image and video encoding techniques that result in greater compression ratios than are achieved by existing techniques.

It is another object of the present invention to provide HDR image and video encoding techniques that introduce relatively few errors into the data.

It is yet a further object of the present invention to provide HDR image and video encoding techniques that are less complex than existing techniques.

It is yet a further object of the present invention to allow exploitation of all the combinations available in 16 bits of data, or more, while the output can still be compressed with common image or video compression algorithms, such as JPEG and MPEG, without considerable losses in precision.

In accordance with various embodiments of the present invention, the processes/techniques disclosed herein provide low dynamic range texture encoding and compression for 3D applications including, but not limited to, video-games, console-games, interactive software and rendering software.

In accordance with a first embodiment of the present invention, all, or part of mapped textures of the same size within a scene are rendered into a new single texture maintaining the original texture thing. The new texture is separated into its chrominance and luminance components and the chrominance part of the texture (called cumulative chroma texture or CC-texture) is mapped back. The original textures are taken in groups of three or four (or more), and converted into their respective luminance parts only, and each is stored as a single color channel of a single new texture (called cumulative luma texture or CL-texture) for each group. A new texture (called index texture or ID-texture) is created, with each color channel representing the index to each of the original three or four (or more) textures. A pixel shader program or equivalent can be utilized to read an index from the ID-texture and reconstruct the original texture by recombining the CC-texture with the specified luminance part stored in a channel of one of the CL-textures generated.

In accordance with another embodiment of the invention, low dynamic range texture encoding and compression are provided for 3D applications including, but not limited to, video-games, console-games, interactive software, and rendering software. All or part of the UV-mapped textures of the same size and resolution within a scene are rendered into a new single texture of any desired size, following a dedicated second UV set and maintaining the relative texture tiling. The new texture is separated into its chrominance and luminance components, and the chrominance part of the texture (cumulative chroma texture or CC-texture) is mapped back using the second UV set. The CC-texture represents the chrominance part of the region originally mapped with many different textures. The original textures are taken by groups of three or four (or more) and converted into their respective luminance parts only and each is stored as a single RGB or RGBA channel respectively of a single new texture (cumulative luma texture or CL-texture) for each group, so that any single CL-texture represents three or four (or more) original textures. The areas originally covered by each of the three or four (or more) textures in the texture groups are color-coded using a very small RGB or RGBA texture (ID-texture), with each color channel representing the index to each of the original three or four (or more) textures. A pixel shader program or equivalent is able to read an index from the ID-texture and reconstruct the original texture locally by recombining the CC-texture with the specified luminance part stored in a channel of one of the CL-textures generated.

As an aspect of the invention, variable dynamic range texture encoding and compression is provided by carrying out some of the above-summarized processes. Each CL-texture channel representing luminance values are linearly scaled by a factor smaller than one in a manner that minimizes the error derived from the loss of data caused by scaling. The values are damped in the range between 0 and 1.0, with 1.0 representing the maximum decimal number according to the number of bits used for each channel. The visible error introduced can be distributed on the CC-texture and thus reduced or eliminated by using an error-correction technique.

As another aspect of the invention, multi-material texture encoding is provided by carrying out some of the above-summarized processes. Instead of storing groups of three or four (or more) luminance textures, one of the channels into the new texture is reserved to the luma component for texture color reconstruction. The mask-texture is not needed and the remaining two or three (or more) channels may be used to store additional material information including, but not limited to, specularity, reflectivity and transparency.

As a further aspect of the invention, variable dynamic range image sequence encoding is provided by carrying out some of the above-summarized processes. An ID-texture, or an explicit numeric index, is cycled for the entire image sequence duration so that at each frame it always represents either index number one (red), number two (green) or number three (blue), or a mix of such indexes. Each frame of the CL-texture in the image sequence represents three frames in an image sequence that is being played back.

As an additional aspect of the invention, high dynamic range texture, and image sequence encoding is provided by carrying out some of the above-summarized processes. After the CC-texture is created, the luminance part of each original HDR texture in the scene is encoded using a finite non-linear sum, and storing each term in each channel of a new texture or frame.

As yet a further aspect of the invention, high dynamic range texture, and image sequence encoding is provided by carrying out some of the above-summarized processes. After the CC-texture is created, a LDR luminance texture is created by clamping values of the HDR luminance texture within the range of 0.0 to 1.0. A fractional luminance texture (FL-texture) is created by dividing the LDR luminance texture by the HDR luminance texture.

As yet another aspect of the invention, low and high dynamic range image sequence encoding is provided by carrying out some of the above-summarized processes. The input HDR frame's RGB values are clamped within the range of 0.0 to 1.0, and generating an LDR version of the HDR frame. An RGB fractional color frame (FC-texture) is generated by dividing the LDR by the HDR frame, channel by channel respectively.

As yet another aspect of the invention, High Bit-depth image, and video encoding is provided. A 96 bit/pixel (high dynamic range—HDR, or High Bit-depth floating point) image or video is clamped at 24 bit/pixel and compressed using any common image or video compression algorithm and the result is stored as a common image or video sequence. The compressed image or video is then decompressed and a quantization of the luminance values is performed thereby reducing the possible pixel values to a range between 2 and 256, i.e. to between 1 and 8 bits. A linear interpolation of values between 0.0 and 1.0 (or 0 and 255) is then performed between each pixel value of the quantized image by comparing it with the original pixel of uncompressed HDR image. For each group of pixels of the same value in the quantized image, the linear interpolation values restart from 0.0. In order to avoid high frequency differences between neighbouring pixels throughout all the shades, an inversion step may be applied in order to create a smoother interpolation throughout the entire image. The result of the interpolation is stored in an 8 bit/pixel secondary image, or by employing a frame that is double in height or in width, that may be further compressed using any common image or video compression algorithm such as JPEG or MPEG. The present encoding method can also be applied for each RGB component, instead of luma alone.

As would be appreciated by one of ordinary skill in the art, the present invention as herein described provides several advantages over existing systems/processes. In accordance with one advantage, the present invention advantageously allows any JPEG-like, MPEG-like, or other image, texture and/or video compression system/technique to lossy compress LDR and HDR and High Bit-depth image and texture data with a selectable level of introduced error.

The present invention advantageously enables HDR images and video to be filtered using existing LDR filters including, but not limited to, de-blocking, de-ringing, and film effect, without generating perceivable artifacts. The present invention, as compared to existing encoding/compression systems/techniques, advantageously requires relatively little computational power and advantageously allows current hardware/compression systems to be exploited without the need for additional coding stages, as well as special, ad-hoc filtering.

The present invention further advantageously enables 3D applications to merge together a number of 3D objects that are able to use the same texture, thus leading to polygon batch optimization, and to apply further texture compression systems, including but not limited to DXTC and 3Dc, to the generated CL-textures.

The present invention further advantageously enables 16-bit luma or 48-bit RGB images or movies to be encoded in two separate images or movies, or by employing a frame that is double in height or in width, and compressed/decompressed using widely known technologies such as JPEG and MPEG. The method also presents the advantage of acting as an "encoded deblocking filter" even on common 24-bit capable displays.

Various other objects, advantages, and features of the present invention are described below and additional objects, advantages, and features of the present invention will become readily apparent to those of ordinary skill in the art.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-11 of the drawings, in which like numbers designate like parts.

Existing compression algorithms/techniques, such as JPEG, DXTC and MPEG, as well as long used television standards such as NTSC, demonstrate that high frequency details, mainly represented by the luminance component of an image, are substantially more important than the chrominance component of an image. The techniques described herein take this into consideration. Moreover, the present invention solves in several ways the linear representation of a series of exponential numeric values, i.e., the pixels of an HDR texture or image or image sequence, as described herein.

In the description provided herein, various formulas (i.e., equations) are described. The following conventions are used to assist in an understanding of the present invention. First, when an operation involving an RGB (Red, Green, Blue) vector "member" is performed, it is intended to be performed on each component and/or the result to be stored in each component respectively, as illustrated in Examples 1 and 2 provided below.

EXAMPLE 1

$$FRAME.rgb = CHROMA.rgb * f$$
$$\equiv$$
$$FRAME.r = CHROMA.r * f$$
$$FRAME.g = CHROMA.g * f$$
$$FRAME.b = CHROMA.b * f$$

EXAMPLE 2

$$FRAME.rgb = CHROMA.rgb * FC.rgb * f$$
$$\equiv$$
$$FRAME.r = CHROMA.r * FC.r * f$$
$$FRAME.g = CHROMA.g * FC.g * f$$
$$FRAME.b = CHROMA.b * FC.b * f$$

Clamping and "dot" functions employed herein are provided in the "pseudo-code" functions provided below.

| Pseudo-Code Functions |
| --- |
| CLAMP(x, a, b) ≡ If (x < a) then x = a; else If (x > b) then x = b |
| DOT(X.rgb, Y.rgb) ≡ X · Y ≡ (X.r * Y.r) + (X.g * Y.g) + (X.b * Y.b) |

Each of the figures represents functional block diagrams. Each block within the figures may represent one or more discrete stops/processes that are carried out by one or more devices/systems. Conversely, one device/system may carry out the functions/processes represented by multiple blocks. In various figures, dotted blocks represent optional steps/ functionality or possible outputs (after an optional step/ functionality is applied). Shaded blocks represent direct encoding outputs.

As would be appreciated by one of ordinary skill in the art, the herein described processes are particularly well suited for 3D applications. In particular, in a 3D application, the present invention enables the encoding of a variable number of textures so that fewer textures are effectively used, thus using less memory, by exploiting the higher details contained in the luminance component of any texture. It is; however, understand that the herein described processes may be used outside the 3D field(s).

First Encoding and Decoding Methods of the Present Invention

Figure 1:
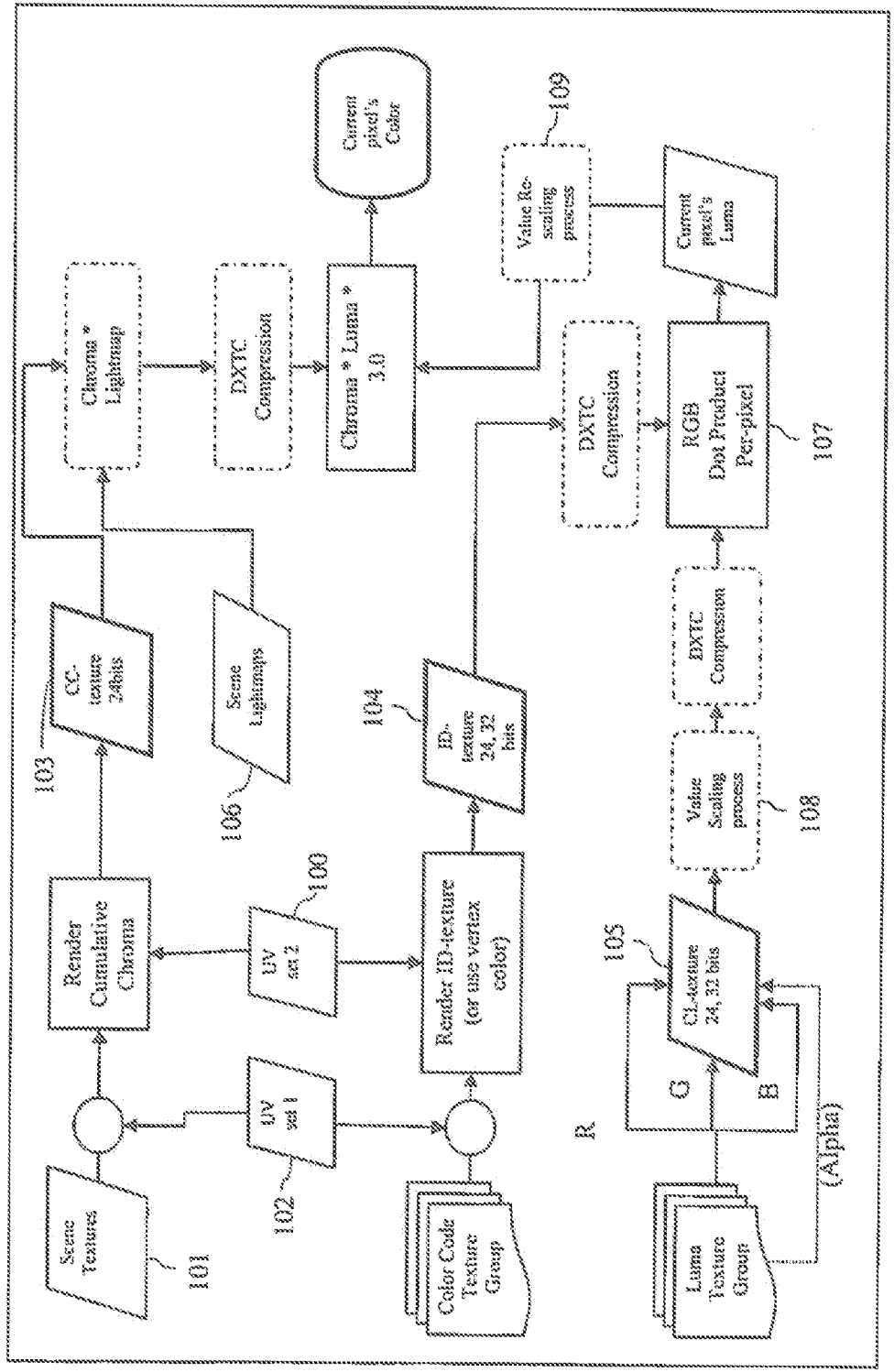
FIG. 1 is a functional block diagram in accordance with a first method of encoding and decoding of the present invention.

A first encoding/decoding method in accordance with a first embodiment of the present invention is described below, in which a 3D scene or object is provided on which multiple 24-bit textures have been applied using "UV texture mapping." The first encoding/decoding method described herein is schematically illustrated in FIG. 1 of the drawings.

Initially, a second UV-set 100 is created that uniquely represents each 3D vertex as a unique UV value, that is, that maps every vertex, and wherein there is no overlap between any UV value. By using a UV-based rendering method known as "texture baking," a cumulative rendering of all the applied textures is performed. The texture baking process writes new pixels into a newly generated texture following the mapping specified by the second UV-set 100, but reading all the originally mapped textures 101 by following the original UV-set 102, thus writing pixels according to the initial mapping so that any tiling or stretching of the original textures is explicit into the newly generated texture. The generated texture (called cumulative rendering texture or "CR-texture") can be of any size and resolution.

An 8-bit grayscale luminance and an RGB chrominance version (called Cumulative Chroma texture or "CC-texture" 103) of the CR-texture are created using any known method. Preferably, the CieXYZ color-space is taken as a reference in order to generate the chrominance texture, as shown in "Formula 002" below, and the luminance texture is the average of the sum of the RGB channels, as shown in "Formula 001" below. More particularly, the CR-texture is separated into chroma and luma components. Chroma (the Cumulative Chroma or CC texture 103) is obtained by dividing the CR texture with the sum of the CR-texture's RGB components, and the luma is the average of the CR-textures RGB components, and is used to obtain the Cumulative Chroma texture 103. The luma texture, and thus the chroma, may also be obtained by weighting the RGB components, as represented in formulas 001 and 002.

LUMA=(R+G+B)/3 (preferred)

Or

LUMA=(0213*R+0.715*G+0.072*B)  Formula 001

CieXYZ color space

CHROMA.X=R/(R+G+B)

CHROMA.Y=G/(R+G+B)

CHROMA.Z=B/(R+G+B)  Formula 002

The CC-texture 103 effectively represents the chrominance. The generated texture (Cumulative rendering texture or "CR-texture") can be of any size and component of all the textures originally applied to the scene. The chroma values for the CC-texture 103 also can be computed directly during the texture baking process.

A color-coded index texture (Cumulative index texture or "ID-texture" 104) is created for the entire scene or the object. In a preferred embodiment, groups of three 24-bit textures from the original textures are considered to generate the ID-texture 104. Groups are made up of textures having the same size and resolution. Groups of 4 textures are possible by using the alpha channel in a 32-bit texture. The ID-texture 104 is an RGB texture of any desired size and resolution, wherein each color channel fully or partially represents the index to any of the three corresponding original textures in a group. For example, in the first group of 3 textures, a pixel value of (255, 0, 0) in the ID-textures 104 indicates that texture n.1 is fully visible, thus the current pixel fully refers to texture n.1. Similarly, a pixel value of (0, 255, 0) fully refers to texture n.2, etc.

Each 8-bit luminance component of each original texture in a group may be stored into each RGB channel of a new texture (Cumulative luminance texture or "CL-texture" 105) of the same size and resolution of the ones in the current group. Thus, a single RGB 24 bit CL-texture 105 contains luminance, high frequency data from three 24-bit original textures. By exploiting chroma sub-sampling, the CC-texture 103 can be much smaller in size and resolution than the original applied mapping, while the memory required by the ID-texture 104 can be often neglected as the size and resolution needed for it is usually several times less than the original texture size.

All generated textures optionally may be further compressed using any suitable compression algorithm including, but not limited to, DXTC, which is widely used in 3D applications.

The CC-texture 103 further may be more useful when the 3D application employs "lightmaps" 106 throughout a scene. Since lightmaps 106 contain light information (e.g., color and intensity data), they can be pre-multiplied with the CC-texture 103, as shown in Formula 003 below. The latter operation does not affect the reconstruction process involved in the present method.

PREM_LIGHTMAP.rgb=LIGHTMAP.rgb*CC-TEXTURE.rgb     Formula 003

The encoding method of the present invention optionally may employ 3D textures in hardware. Since a 3D texture can store up to 6 RGB or RGBA 2D textures, a 3D CL-texture 105 can store 18 luminance textures for the RGB type and 24 for the RGBA type.

To recover the original texture color for the current pixel, a pixel shader program or other suitable software program may be used. The decoding program gathers the information needed, i.e., the corresponding CC-texture 103 (Term A), ID-texture 104 (Term B) and CL-texture 105 (Term C) value, for the current pixel.

In a preferred embodiment, the current pixel color is recovered by selecting the appropriate channel, i.e., the appropriate luminance part of the appropriate original texture, in CL-texture 105 using the index provided in the ID-texture 104. The "dot product" 107 between all channels of the ID-texture 104 and all channels of the CL-texture 105 produces the desired result, as represented in Formula 004 below.

CURRENT_LUMA=dot(ID-Texture.rgb, CL-Texture.rgb)=CURRENT_LUMA=(R1*R2+G1*G2+B1*B2)     Formula 004

When the current luminance is selected, it is multiplied back with the CC-texture 103 and rescaling values, accordingly, as shown in Formula 005.

ORIGINAL_COLOR.rgb=(CURRENT_LUMA*CC-TEXTURE.rgb)*3     Formula 005

Further, the ID-texture 104 also can represent blended RGB values for the current pixel, thus allowing smooth or hard blending between the 3 textures represented in CL-texture 105. For example, if the value for the current pixel in the ID-texture 104 equals (127,127,127) in a 24-bit texture, the final reconstructed luminance is the average of all the luminance textures stored in the CL-texture 105. Formula 006 below summarizes the decoding process.

ORIGINAL_COLOR.rgb=$(R_1*R_2+G_1*G_2+B_1*B_2)$*CC-texture.rgb*3     Formula 006

Moreover, when "cubemaps" are used, rather than 2D textures, a total of 24 grayscale textures may be stored together with a color-coded ID cubemap and a small mask texture representing the color-coded index to the cube face axis, i.e. ±X,Y,Z. (6 cube faces*4 RGBA channels).

As a variation of the above-described process, a higher luminance range may be encoded into the CL-texture 105 by scaling each RGB channel 108 in the CL-texture 105 (called scaled luminance LDR or SLLDR-texture) by a factor <1.0, as shown in Formula 007. Hence, a few orders of magnitude of an HDR texture can be encoded with little loss of data.

CL-texture=CL-texture*factor     Formula 007

To recover the original value, the variable dynamic range CL-texture 105 is scaled back 109 by the inverse of the factor, as shown in Formula 008.

CL-texture=CL-texture*(1/factor)     Formula 008

For example, when values are scaled by a factor of 0.25, it is possible to store a maximum corresponding float value of 4.0 equivalents to a maximum integer value of 1024 of an LDR texture.

However, with factors of 0.125 and smaller, banding artifacts, brought about when too few colors are used to represent all of the original shades (seen as visible stripes or bands of shades) may be introduced and thus become noticeable to the human eye. In such case, that is, for factors less than or equal to 0.125, the present invention provides for additional error correction (to minimize visible artifacts) by calculating the chrominance texture (CC-texture 103) by using luminance information of the SLLDR-texture (discussed above), rather than the HDR CR-texture, as represented in Formula 008b below. Hence, the extra luminance data used to correct the error are partially stored in the chrominance texture.

$SCE.x=(R/SLLDR)*f$ $SCE.y=(G/SLLDR)*f$ $SCE.z=(B/SLLDR)*f$     Formula 008b

In Formula 008b, SCE is the Scaled Chrominance Error image, SLLDR is the Scaled Luminance LDR version of the HDR luminance image, and "f" is an appropriate scaling factor.

In other words, after the luminance texture is scaled and clamped, and converted in an 8-bit format (Scaled Luminance LDR or SLLDR-texture) in the range of 0 to 255, the chrominance texture is obtained by using Information from the SLLDR-texture, instead of using the HDR luminance information, and scaled by the scaling factor.

From the foregoing described error correction, it is seen that part of the values discarded from the SLLDR-texture due to scaling and quantization are represented in the chrominance component (Scaled Chrominance Error texture or SCE-texture), thus, in effect, distributing the error. Depending on how well the chrominance texture or image is preserved, it is possible to minimize the error up to an average error ratio of 0.001:1.0 for the whole texture or image for a base HDR luminance scale value of 0.125.

As another variation, different compatible textures may be encoded into the remaining texture channels of the CL-texture 105. Since one of the channels is reserved for luminance information from any one original texture, the remaining channels may be employed to store other 8-bit texture data including, but not limited to, specularity, reflectivity, and transparency data. In such case, the ID-texture 104 is no longer necessary since the CL-texture 105 does not contain three different luminance textures in this variation, but rather different features within the same material set. The different features are pre-known or pre-designated and thus be accessed directly by addressing the respective channel in the CL-texture 105.

Second Encoding and Decoding Methods of the Present Invention

Figure 2:
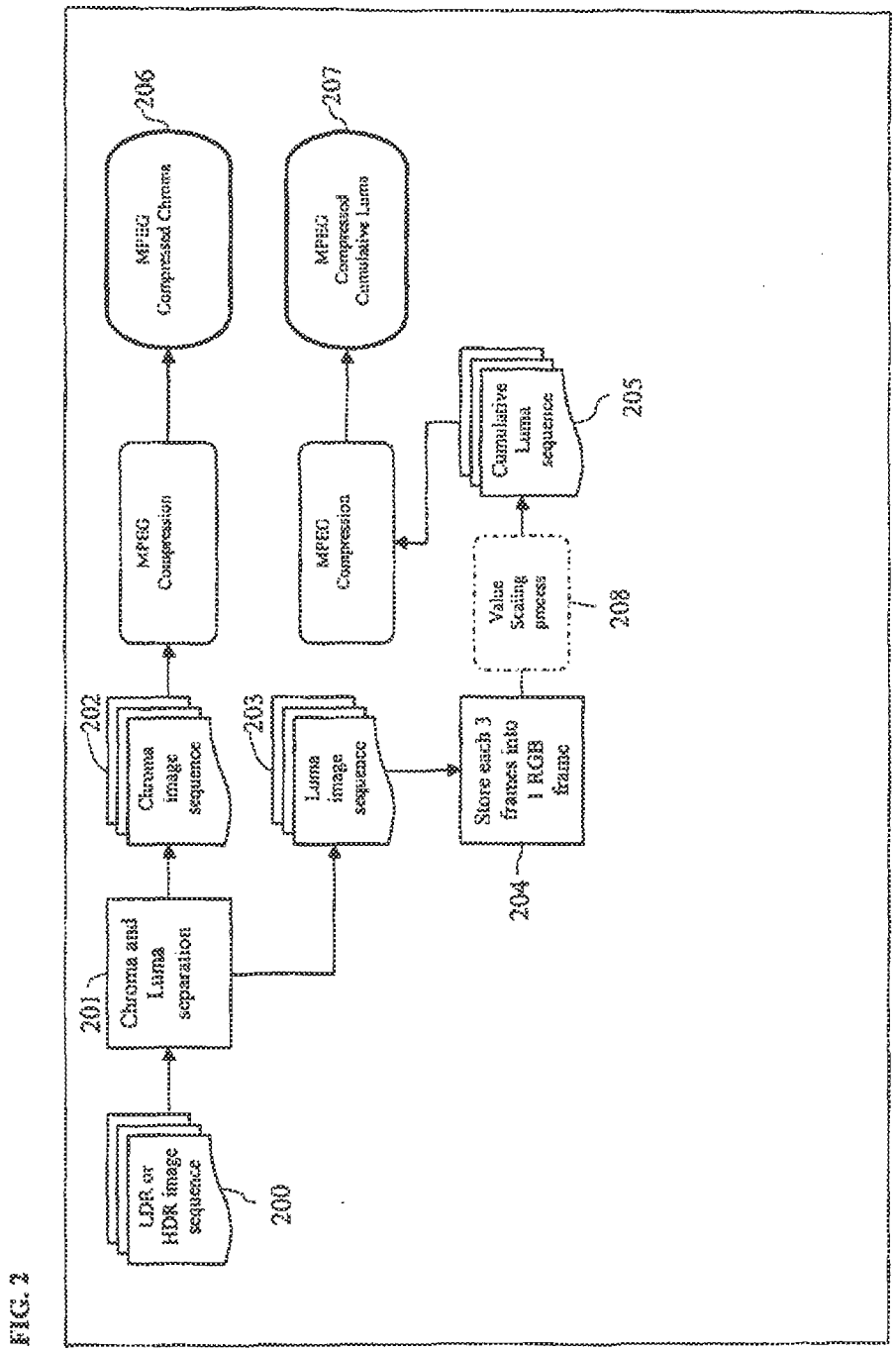
FIG. 2 is a functional block diagram in accordance with a second encoding method of the present invention.

In accordance with another embodiment of the present invention, and with reference to FIG. 2, which functionally shows the second encoding process herein described, each frame of an LDR or HDR image sequence 200 initially is separated into its chrominance and luminance components (Chroma and Luma Separation 201), employing Formulas 001 and 002 provided above, to produce a chroma image sequence 202 and a luma image sequence 203.

Groups of three (3) frames from the luminance sequence 203 are stored in a single 24-bit RGB frame (Cumulative Luminance or "CL-frame" 204) preferably in the following order: luminance frame 1 in the red channel; luminance frame 2 in the green channel; and luminance frame 3 in the blue channel. Another order may be employed, if desired. Both the chrominance frame sequence (CC-frame sequence 202) and the cumulative luminance frame sequence 205 (sequence of CL-frames 204) are compressed separately using any known, suitable compression algorithm/technique including, but not limited to, MPEG, to produce compressed streams of data (Compressed Chroma 206; and Compressed Luma 207). The resultant luminance stream includes one-third the number of original frames.

Optionally, the CC-frame sequence 202 may be sub-sampled prior to being compressed. Moreover, the luminance frame sequence may be scaled by a suitable factor 208 in the manner discussed above.

Figure 3:
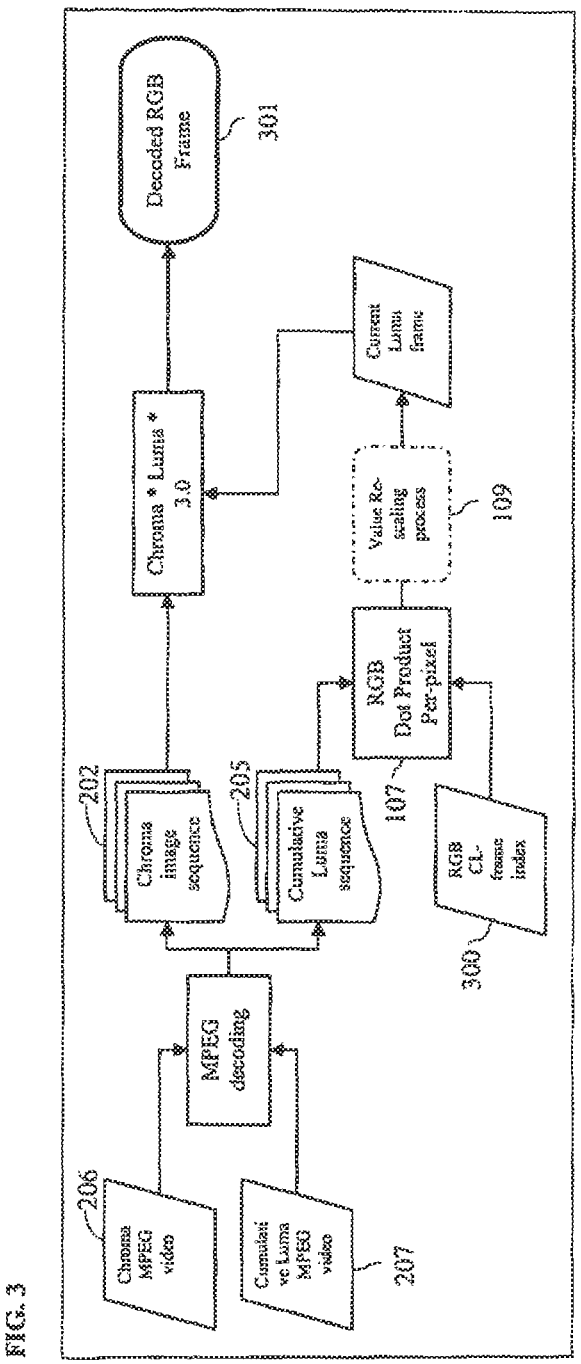
FIG. 3 is a functional block diagram in accordance with a second decoding method of the present invention.

FIG. 3 functionally shows the process of decoding the above-described compressed streams of data. Initially, three frames of the chrominance stream 206 and one frame of the luminance stream 207 are decompressed (i.e., decoded) in accordance with the previously selected compression algorithm/technique (e.g., MPEG decoding), employing the known format (i.e., known order as described above) of the coded cumulative luminance stream 207.

Each luminance frame is extracted from the decoded cumulative luminance sequence 205 (CL-frame) utilizing Formula 004 107 described above. Here, the ID-texture 104 is an ID-vector 300 of three floating point or integer values. Each color frame 301 is decoded by multiplying back the chroma and luma components in accordance with Formula 005 discussed above.

If necessary, and particularly for an HDR image sequence, the CL-frame 205 values may be re-scaled 109 (i.e., scaled back by the inverse of the factor utilized) (see Formula 008b above).

Third Encoding and Decoding Methods of the Present Invention

Figure 4:
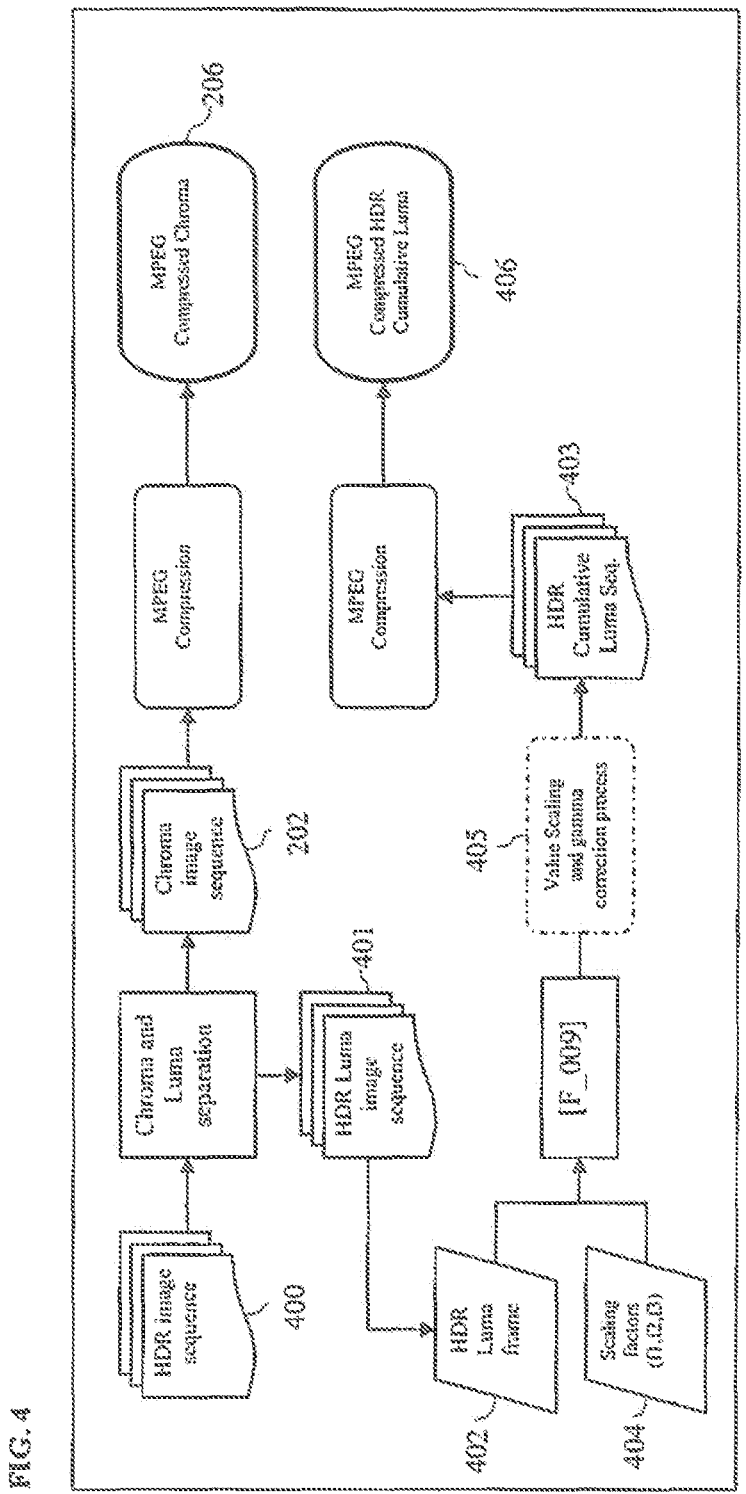
FIG. 4 is a functional block diagram in accordance with a third encoding method of the present invention.

In accordance with a further embodiment of the present invention, and with reference to FIG. 4, which functionally shows the third encoding process herein described, each frame of an HDR image sequence 400 initially is separated into its chrominance and luminance components (Chroma and Luma Separation), employing Formulas 001 and 002 provided above, to produce a chroma image sequence 202 and an HDR luma image sequence 401.

In accordance with this embodiment, each frame 402 of the HDR luma image sequence is separated into, preferably, three (3) different levels of luminance and stored into a new RGB 24-bit frame (called herein, High Dynamic Range Cumulative Luminance frame or "HDRCL-frame" 403) in accordance with Formula 009 provided below (also employing the "pseudo-code" clamp function provided above). Formula 009 (F_009 in FIG. 4) represents the preferred embodiment by providing three (3) discrete steps, with three (3) different scaling factors 404. In a variation, a different number of steps/scaling factors may be employed.

$$L_1 = (HDRL * f_1)^{\wedge 1/\gamma_1}$$

$$HDRCL.r = CLAMP(L_1, 0, 1.0)$$

$$L_2 = ((L_1 - HDRCL.r) * f_2)^{\wedge 1/\gamma_2}$$

$$HDRCL.g = CLAMP(L_2, 0, 1.0)$$

$$L_3 = ((L_2 - HDRCL.g) * f_3)^{\wedge 1/\gamma_3}$$

$$HDRCL.b = CLAMP(L_3, 0, 1.0) \qquad \text{Formula 009}$$

In Formula 009 above, f1, f2, and f3 represent different scaling factors 404 between the range of 0.0 to 1.0. The scaling factors 404 may be stored for each frame or for the entire sequence. If scaling factor f3 is small enough, the clamping operation is not need for HDRCL.b. Each step optionally may be gamma corrected and/or scaled and error-corrected 405 in the manner described above. $\gamma_1$, $\gamma_2$, and $\gamma_3$ in Formula 009 above are the gamma correction factors, if applied.

The principle behind Formula 009 is to define discrete and linearly compressed luminance ranges by subtracting and thus eliminating clamped and scaled values in the range $0 \leq v \leq 1.0$ from the current HDR luminance level.

In order to minimize the range linear compression effects, introduced by scaling the current range by a factor f, a gamma correction function may be applied before storing the current luminance level into an 8-bit channel of the HDRCL-frame. Since each clamped frame is subtracted from the current luminance level, a smaller factor can be employed in the next luminance level as the remaining values are mostly >1.0.

After applying Formula 009 and optionally value scaling and gamma correcting, as described above, the HDRCL-frame sequence 403, as well as the chrominance sequence 202, are compressed using any known compression technique, such as MPEG, to produce a compressed HDR Cumulative luminance stream 406 and a compressed chrominance stream 206, respectively, or into a larger movie. The three factors 404 used to scale the luminance ranges, as well as the three gamma values, may be stored in a header of the preferred file format. Moreover, the chrominance frame sequence 202 may be sub-sampled.

Figure 5:
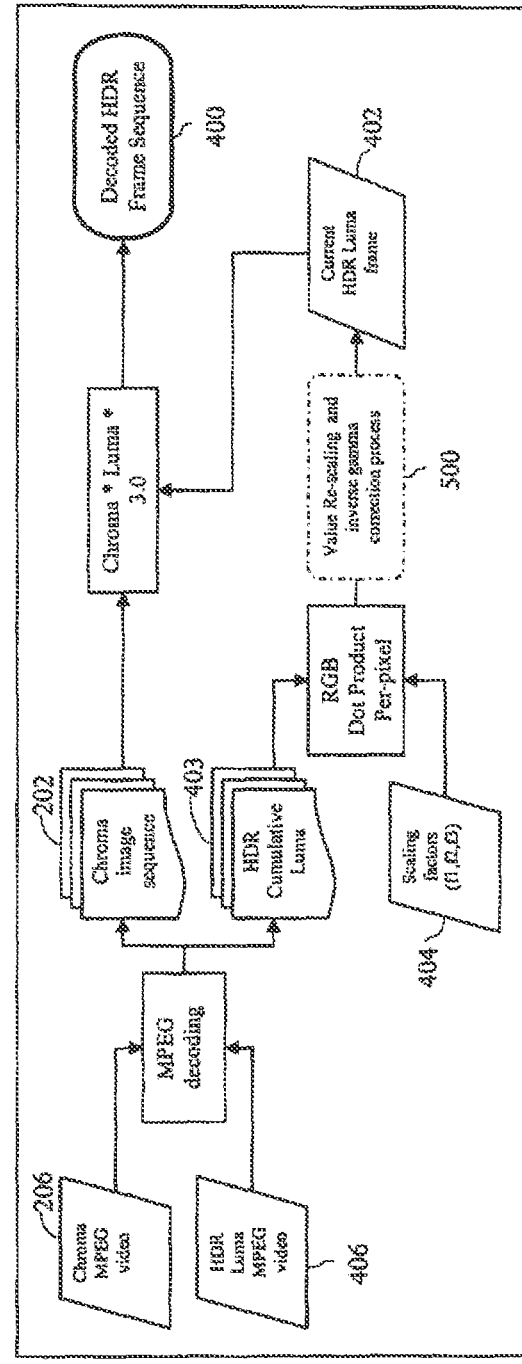
FIG. 5 is a functional block diagram in accordance with a third decoding method of the present invention.

FIG. 5 functionally shows the process of decoding the above-described compressed streams of data. Initially, the compressed luminance stream 406 and compressed chrominance stream 206 are decompressed (i.e., decoded) in accordance with the compression algorithm/technique used to compress the data (e.g., MPEG decoding). Each resultant HDR luminance 402 frame is decoded from the HDRCL-frame 403 by applying the inverse gamma correction function 500 (power function) to each channel of the HDRCL-frame 403 and calculating the scalar dot product between the three (3) luminance scaling factors 404 and the three (3) channels in the HDRCL-frame 403, as represented in Formula 010 shown below.

$$Y.xyz = (Y_1, Y_2, Y_3) \qquad \text{Formula 010}$$

$$F.xyz = (f_1, f_2, f_3)$$

$$HDRCL.r = HDRCL.r^{\wedge Y_1}$$

$$HDRCL.g = HDRCL.g^{\wedge Y_2}$$

$$HDRCL.b = HDRCL.b^{\wedge Y_3}$$

-continued $$HDRL = \text{dot}(F.xyz, HDRCL.rgb)$$

$$\equiv$$

$$HDRL =$$

$$(F.x * HDRCL.r + F.y * HDRCL.g + F.z * HDRCL.b)$$

In Formula 010 above, γ and F are floating point scalar vectors.

Finally, the chrominance frame 202 is multiplied back with the recovered HDRCL-frame 402, as set forth in Formula 011 below.

$$HDRL = \text{dot}(F.xyz, HDRCL.rgb) * CHROMA.rgb * 3 \quad \text{Formula 011}$$

Fourth Encoding and Decoding Methods of the Present Invention

Figure 6:
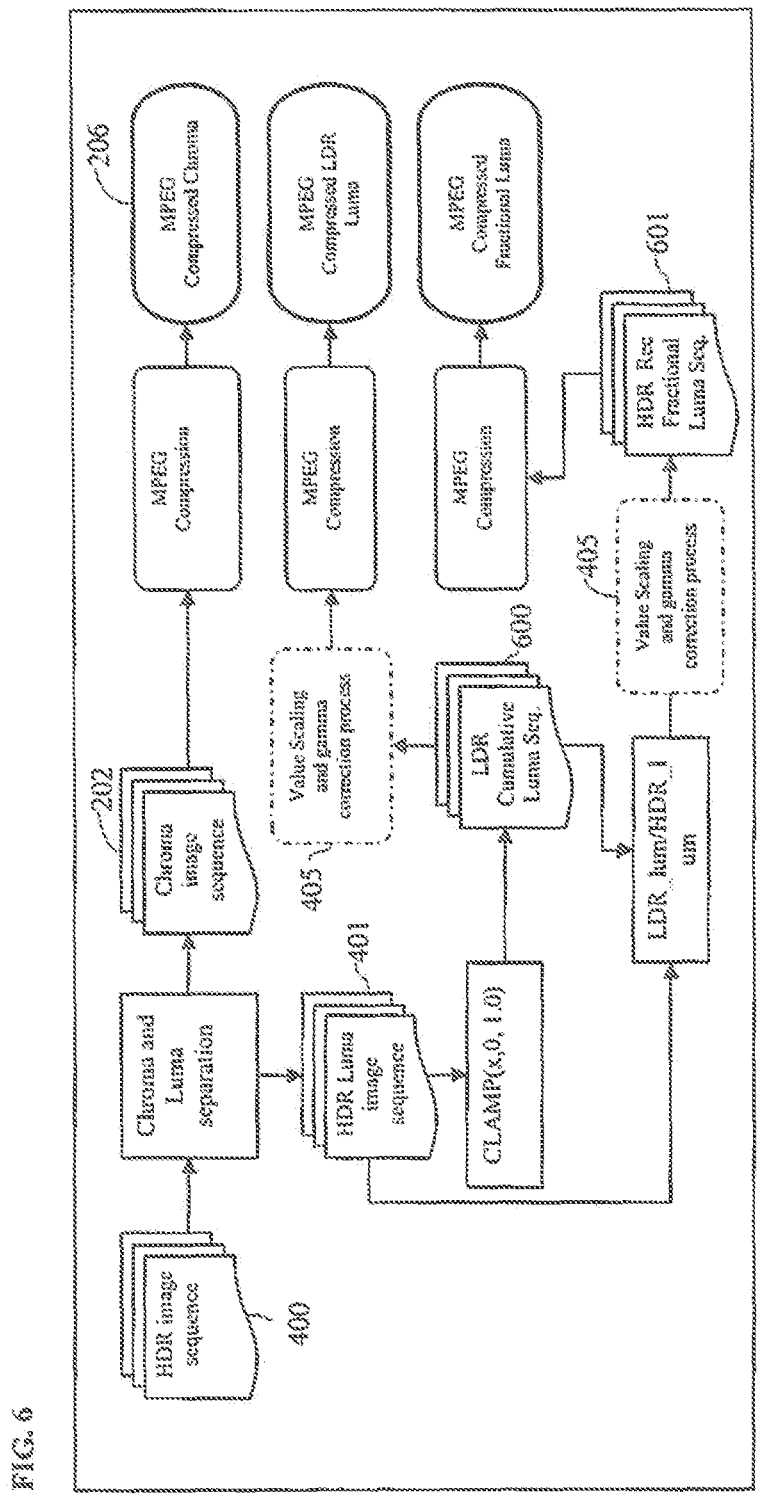
FIG. 6 is a functional block diagram in accordance with a fourth encoding method of the present invention.

In accordance with another embodiment of the present invention, and with reference to FIG. 6, which functionally shows the fourth encoding process herein described, each frame of an HDR image sequence 400 initially is separated into its chrominance and luminance components (Chroma and Luma Separation), employing Formulas 001 and 002 provided above, to produce a chroma image sequence 202 and an HDR luma image sequence 401.

Each frame of the HDR luma image sequence 401 is damped in the range 0≤x≤1.0, thus obtaining the LDR version of the HDR luminance frame (LLDR-frame 600). A gamma correction function and a scaling factor 405, as described above, optionally may be applied to each LLDR-frame 600. The LLDR-frame 600 is divided by the HDR luminance frame 401 to obtain an 8-bit reciprocal fractional luminance frame (FL-frame 601). That is, a reciprocal representation of all the values>1.0 in the HDR luminance frame 401. A gamma correction function and a scaling factor 405 optionally may be applied to each FL-frame. These processes are represented in Formula 012 below.

$$LLDR = CLAMP(HDRL, 0, 1.0)$$

$$FL\text{-frame} = (LLDR/HDRL * f)^{-1/\gamma} \quad \text{Formula 012}$$

Finally, the LLDR-frame sequence 600, FL-frame sequence 601 and chrominance frame sequence 202 are compressed using any known compression system, such as but not limited to MPEG, to produce three (3) separate streams or into a larger movie. The chrominance frames 202 and FL-frames 601 may be sub-sampled.

In the foregoing described process, when the LDR-frame 600 is divided by the HDR-frame 401, the resulting FL-frame 601 usually contains mostly large areas of white pixels (1.0, 1.0, 1.0) or (255, 255, 255), wherein the original pixel values are in the range 0≤x≤1.0. Thus, the FL-frame 601 represents relatively small amount of overhead after it is compressed using a video compression algorithm, since large areas of uniform pixel values in a frame generally are well optimized by most video compression techniques.

Figure 7:
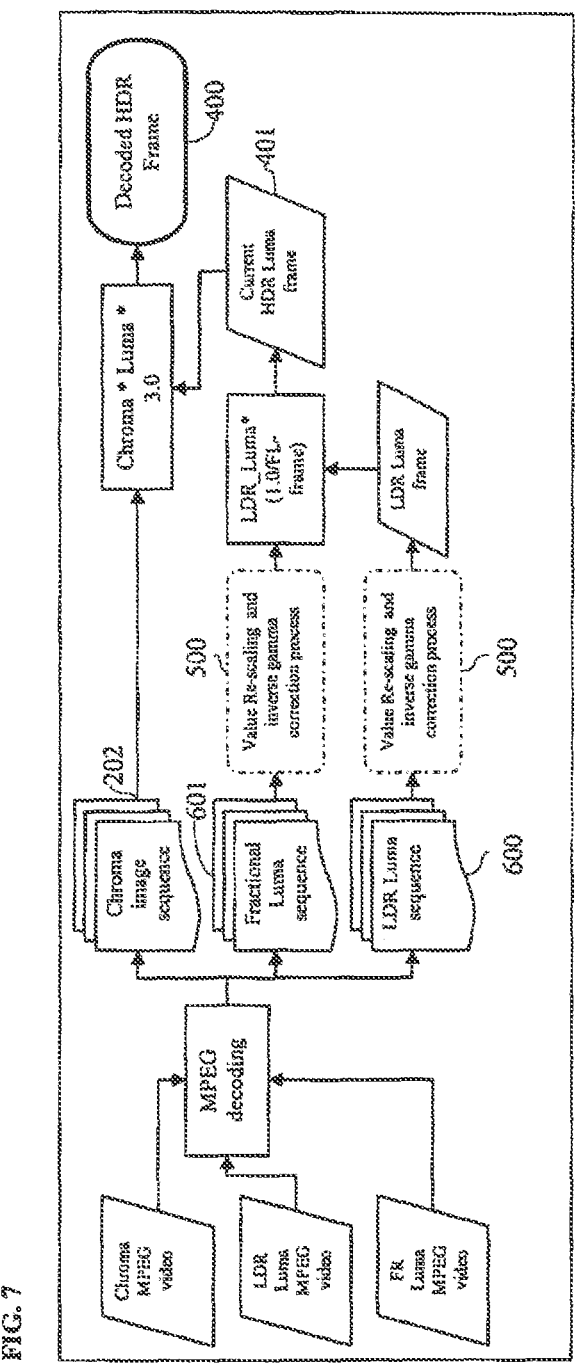
FIG. 7 is a functional block diagram in accordance with a fourth decoding method of the present invention.

FIG. 7 functionally shows the process of decoding the above-described compressed frame sequences. Each of the frame sequences are de-compressed (e.g., MPEG decoding) to produce chrominance image 202, fractional luminance 601 and LDR luminance sequences 600. If applicable, the LLDR-frame 660 or the FL-frame 601 is re-scaled and/or inverse gamma corrected 500.

The HDR luminance component 401 is recovered by applying the reciprocal fractional function to the FL-frame 601 and multiplying it back with the LLDR-frame 600. The chrominance 202 and HDR luminance frame 401 are re-multiplied back to obtain the original HDR frame 400, as set forth in Formula 013 below.

$$HDR.rgb = (CHROMA.rgb * LLDR * (1.0/(FL^\gamma * (1.0/f)))) * 3 \quad \text{Formula 013}$$

Fifth Encoding and Decoding Methods of the Present Invention

Figure 8:
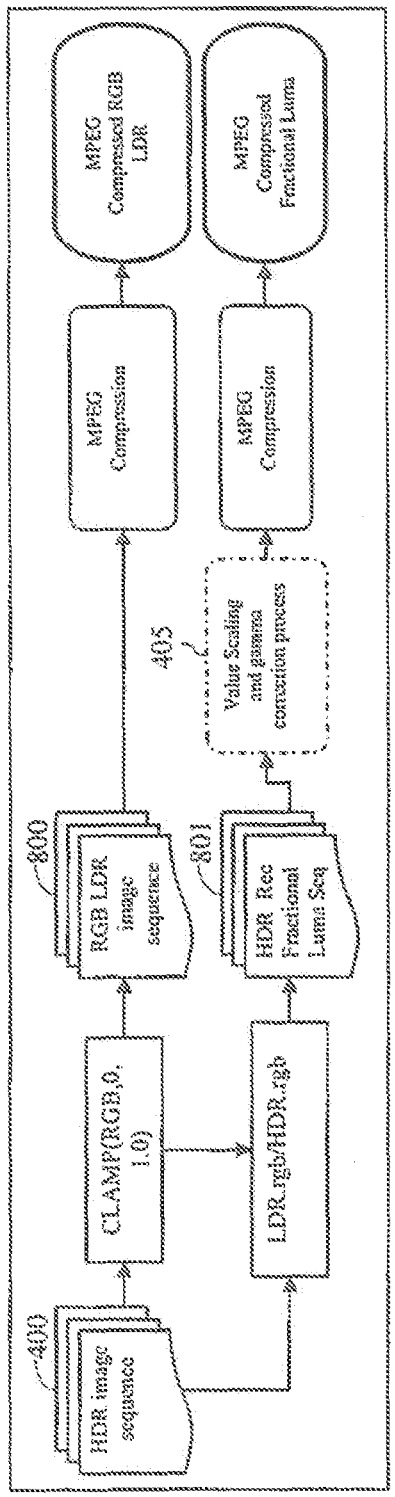
FIG. 8 is a functional block diagram in accordance with a fifth encoding method of the present invention.

In accordance with yet a further embodiment of the present invention, an FL-frame is directly generated for each HDR color channel, as described herein. With reference to FIG. 8, which functionally shows the fifth encoding process herein described, an HDR RGB color frame 400 is clamped in the visible range of 0≤x≤1.0 to produce a color LDR frame (also "CLDR-frame" 800). That is, the value of each color channel is clamped in the range of 0≤x≤1.0. The resulting CLDR-frame 800 sequence is compressed using any appropriate compression algorithm/technique (e.g., MPEG).

Separately, each RGB component of the CLDR-frame 660 is divided by each respective RGB component of the original HDR color frame 400 to produce a 24-bit RGB reciprocal fractional color representation ("FC-frame" 801). Gamma correction and a scaling factor 405 optionally may be applied to each FC-frame 801.

Formula 014 below represents the above-described processes.

$$CLDR.rgb = CLAMP(HDR.rgb, 0, 1.0)$$

$$FC.rgb = (CLDR/HDR.rgb * f)^{-1/\gamma} \quad \text{Formula 014}$$

Similar to the fourth embodiment described above, each RGB channel in the FC-frame 801 contains large areas of uniform white pixels (1.0, 1.0, 1.0) or (255, 255, 255), but in the fifth embodiment each color channel also represents the reciprocal fractional RGB color proportion to the original HDR color frame 400, thus including chrominance and residual chrominance values.

The FC-frame 801 sequence is compressed using any known compression technique (e.g., MPEG).

Figure 9:
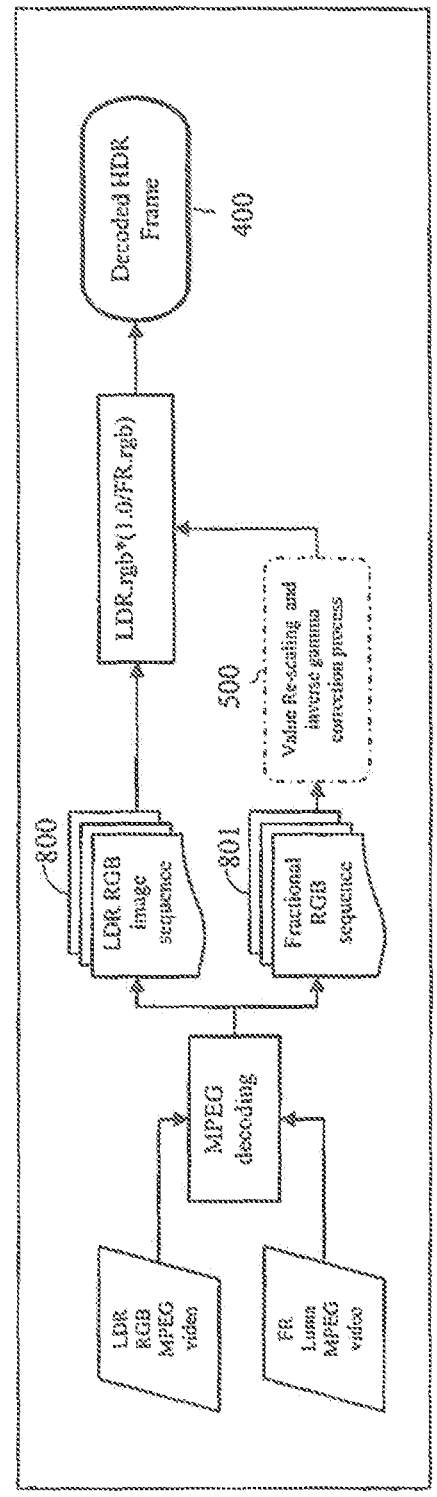
FIG. 9 is a functional block diagram in accordance with a fifth decoding method of the present invention.

FIG. 9 functionally shows the process of decoding the above-described compressed frame sequences. The frame sequences are de-compressed (e.g., MPEG decoding) and, if applicable, the recovered FC-frames 801 are re-scaled and/or inverse gamma corrected 500. Finally, the original HDR frame 400 is recovered by multiplying the LDR color frame 800 with the reciprocal (multiplicative inverse) of the FC-frame 801, as shown in Formula 015 below.

$$HDR.rgb = CLDR.rgb * (1.0/(FC.rgb^\gamma * (1.0/f))) \quad \text{Formula 015}$$

As discussed above, the FC-frame 801 restores chrominance features in the CLDR-frame 800 which were contained in the original HDR color frame 400. When the original HDR color frame 400 is clamped in the range 0≤x≤1.0, each pixel value that is greater than 1.0 is essentially lost in the CLDR-frame 800, and so is any RGB value difference (compared to the original HDR frame 400). As an example, with an HDR pixel value h(2.5,1.5, 1,2) (in HDRI, such a pixel "h" is bright red), the clamped value in the "visible" (8-bit) range is h'(1.0,1.0,1.0), which corresponds to (255,255,255), which represents white. The present invention stores, along with the h' white pixel, the reciprocal fractional representation of the original HDR pixel (i.e. by applying Formula 014), which is the value f(0.4, 0.66, 0.83). To recover the original HDR pixel value, formula 015 is applied, or a simplified version of this formula is applied. In particular, the value of h'*(1.0/f)=(1.0, 1,0, 1.0)*(2.5, 1.51, 1.20)≈h. Hence, the original HDR RGB color channel proportions, together with luminosity values, are restored.

Sixth Encoding and Decoding Methods of the Present Invention

Figure 10:
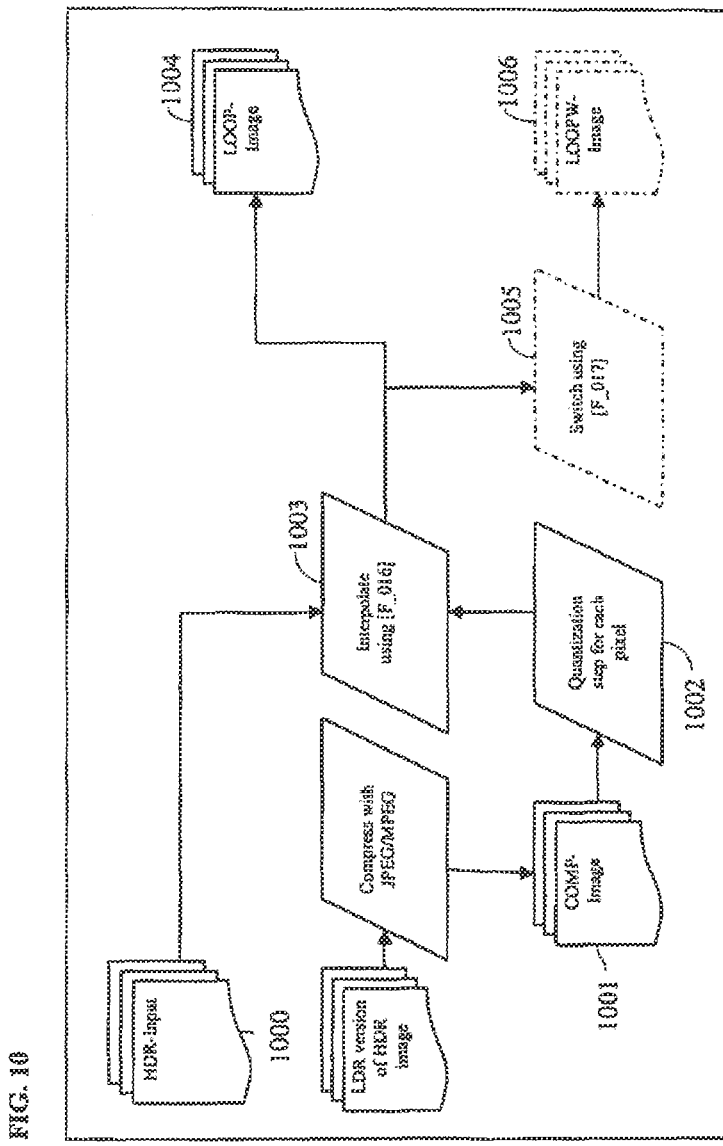
FIGS. 10 and 11 are functional block diagrams respectively illustrating methods of encoding and decoding image data in accordance with a sixth embodiment of the present invention.
Figure 11:
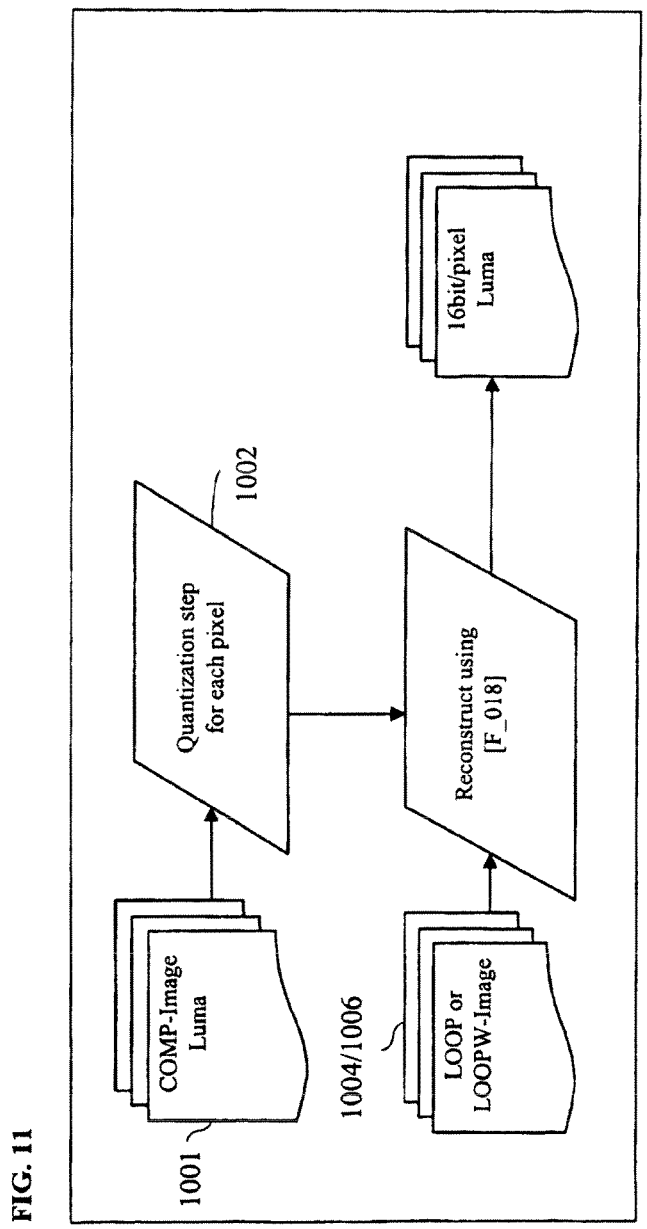

A further embodiment of the present invention, enables 48 bit/pixel precision in RGB or 16 bit/pixel precision in the Luma component of an image or video sequence, even if said images or video are compressed using common image and video compression algorithms such as JPEG or MPEG, is shown in FIGS. 10 and 11.

In the encoding step of the process, shown in FIG. 10, a HDR 96 bit/pixel image or video (HDR-input 1000) and a JPEG or MPEG compressed version of that image or video (COMP-image 1001) are given as inputs. The luma component of COMP-image 1001 is then quantized 1002 between 1 and 8 bits, where the number of bits used for the quantization is decided beforehand or stored in the file header. This basically divides the image in more or less large areas of equally spaced luminance values whatever the number of bits chosen for quantization.

For each quantized step of the luminance component, a linear interpolation of the values 1003 in the luma component of HDR-input 1000 is performed, in accordance with Formula 016:

$$x=\operatorname{abs}((\text{input}-\text{inf})/(\text{sup}-\text{inf})) \qquad \text{Formula 016}$$

where:
"x" is the resulting interpolated value;
"input" is the current HDR-input luminance pixel value:
"inf" is the current quantization value so that inf<input;
"sup" is the next quantization value so that sup>input; and
"abs( )" is a function that returns the absolute value of its argument, i.e. returns x if x>=0 otherwise it returns x*−1.

By interpolating 1003 values across any given quantization step 1002, shades of pixels with values in the range [0,1.0] or [0,255] are used to represent shades across that given quantization step, effectively representing 8-bit precision for each quantization step of the COMP-image 1001 image.

At each subsequent quantization step 1002 the interpolated values 1003 are reset at 0 and a new shade of bits is computed. Interpolated pixels 1003 across all the given quantization steps 1002 are stored in a new image (LOOP-image 1004) of the same size of the original. The LOOP-image 1004 is to be compressed using JPEG or MPEG algorithms.

Due to the value reset performed at each new quantization step the LOOP-image 1004 will contain high-contrast edges of pixels at the beginning of each new quantization step, where pixels in the LOOP-image 1004 corresponding to the end of a quantization step will be white, i.e. (1.0, 1,0, 1.0), while adjacent pixels corresponding to the beginning of the next quantization step will be black, i.e. (0, 0, 0).

Considering the JPEG and MPEG algorithms, the LOOP-image 1004 would not constitute an ideal source input, since it would be prone to artifacts once decompressed. In order to make the LOOP-image 1004 more suitable as a JPEG or MPEG input, a "loop switch" 1005 is performed to make the interpolation across different quantization steps contiguous.

One way to perform the "loop switch" 1005 is to consider odd and even quantization steps, inverting the interpolation at any given odd step—or even step depending on the interpolation value the algorithm starts with, in accordance with Formula 017:

$$\text{Formula 017}$$
$$\text{if (fract(cstep/2.0)} < 0.0)$$
$$\text{loop} = \operatorname{abs}(1.0 - \text{loop});$$

where;
"fract( )" is a function that returns the fractional part of a floating point number, i.e. (x−floor(x)), where floor(x) computes the smallest integer value of x.
"cstep" is the current quantization step value so that cstep<input;
"loop" is the current interpolated value obtained in Formula 016; and
"abs( )" is a function that returns the absolute value of its argument, i.e. returns x if x>=0 otherwise it returns x*−1.

Once the "loop switch" 1005 is applied the resulting image (LOOPW-image 1006) will contain only continuous shades in the range [0,255], where pixels et the end of an even quantization step are white, i.e. (1.0, 1.0, 1.0) and so are adjacent pixels at the beginning of the subsequent quantization step.

It must be noted how the LOOP-image 1004 and LOOPW-image 1006 now effectively represent luminance values at a much smaller quantization step once decoded, using only 8-bit precision.

While in a common 8-bit image each pixel represents a quantization step of 1/256, each pixel in the LOOP-image 1004 or LOOPW-image 1008 effectively represents a step equal to 1/256*Q, where Q is equal to the number of quantization steps, i.e. number of bits/pixel, calculated for COMP-image 1001. The LOOP-image 1006 can now be compressed using JPEG or MPEG.

The decoding step, shown in FIG. 11, requires both the COMP-image 1001 and the LOOP-image 1004 or LOOP-image 1006 as inputs.

The COMP-image 1001 is quantized 1002 using the same number of steps as in the encoding stage. For each quantization step of COMP-image 1001 a corresponding pixel from the LOOP-image 1006 is decompressed and its value is read back. The current value of the current pixel of the COMP-image 1001 calculated quantization is then incremented by adding the LOOPW-image 1006 value to it, multiplied by the reciprocal of the total number of quantization steps in COMP-image 1001, i.e. 1/Q, in accordance with Formula 018:

$$x=c\text{step}+(r\text{step}*\text{loop}); \qquad \text{Formula 018}$$

where:
"x" is the resulting decoded value;
"cstep" is the current quantization step value so that cstep<input; and
"rstep" is the incremental quantization step, so that rstep=1.0/Q, where Q is the total number of quantized values, i.e. bits/pixel
"loop" is the current interpolated value obtained in Formula 016.

The latter procedure is repeated for all the pixels.

As a variation of the present method it is possible to store the quantized version of COMP-image 1001 into any of the three RGB component of LOOPW-image 1006, since the latter only requires 8 bits/pixel to be stored.

It is clear how the same quantization step, and the remaining steps of the present method, can be performed on each of the three RGB image components, instead of on luminance alone. It is also possible to integrate the method of FIGS. 10 and 11 with the methods of FIGS. 6 and 7, or with methods of FIGS. 8 and 9 by means of a threshold function.

In the method of FIGS. 8 and 9, as an integration example, the Color LDR Frame (or CLDR-frame 800) is a clamped RGB version of the HDR input image 400, thus all the pixels whose value is equal to white (1.0, 1.0, 1.0) represent a mask (CLDR-mask) to the reciprocal fractional color representation (FC-frame 801). In fact only the corresponding pixels in the FC-frame 801 have a value that is <(1.0, 1.0, 1.0).

Once the CLDR-mask is obtained by applying a threshold function to the CLDR-frame 800 it is multiplied by the FC-frame 801 obtaining a Masked FC-frame (or MFC-frame). After this operation all the white (1.0, 1.0, 1.0) pixels in the MFC-frame are now black (0, 0, 0). The CLDR-mask is then inverted and multiplied by the LOOP-image 1004 or LOOPW-image 1006, obtaining black pixels in those areas where the FC-frame 801 stores significant data (Masked LOOPW-image or MLOOPW-image).

The MLOOPW-image and MFC-frame are now added together for each RGB component obtaining an Enhanced FC-frame (EFC-frame). The EFC-frame can now be compressed using JPEG or MPEG algorithms.

In order to decode the EFC-frame the same threshold function is applied to the decoded CLDR-frame 800 and the appropriate decoding method is applied, according to the value of each pixel in the CLDR-mask. If the current pixel In CLDR-mask is white (1.0, 1.0, 1.0) then the decoding method of FIG. 9 is applied, otherwise, if the pixel is black (0, 0, 0) the decoding method in FIG. 11 is applied.

The total number of bits/pixel the method is able to reconstruct is given by $\log_2(Q*256)$ for luminance encoding/decoding and for each RGB colour component if all channels are used, where Q is the total number of quantization values, i.e. $2<=Q<=256$.

The above discussed sixth embodiment also particularly allows for advantageously encode a movie intended for both the DVD and HD-DVD or BlueRay Disk formats, just once instead of iterating any common encoding system twice at least in order to support higher density media. Given that the LOOP-image 1004 sequence or LOOPW-image 1006 sequence is separately enhancing the COMP-image sequence 1001, the latter can be encoded using MPEG or other algorithms in order to fit a standard DVD size, while the LOOP-image 1004 sequence or LOOPW-image 1006 sequence can be set to fit the remaining data of an HD-DVD or BlueRay Disk once the COMP-image sequence 1001 has been included.

Various embodiments of the present invention are described herein. In addition to the variations mentioned above, additional variations may be possible. For example, various embodiments may be modified so that not all of the luminance values in a HDR image are preserved (i.e., recoverable). In certain applications, it may not be necessary to recover the entire original dynamic range. In such cases, the present invention may be applied for purposes of encoding the original HDR image so that just a very few orders of extra luminosity values are recoverable.

As another variation/example referring to methods one to five, it may be the case where not all LDR images need 8-bit precision for luminosity representation. In such case, the unused values might mitigate the error introduced by the optional scaling operation when applied to HDR luminance components.

As a further variation of the fifth method, the luminance component image is not subjected to a tone-mapping operation, but rather to a clamping function (i.e. the most common and simplest Tone Mapping Operator possible), thus not requiring the extra precision offered by HDR data.

Still further, the error introduced by optionally scaling the luminance image is not perceptually significant for a number of values of the scaling factor. For example, a scaling factor of 0.5 when applied to the luminance component image, results in an average numeric error of 0.002:1.0, whereas a scaling factor of 0.25 results in an average error of 0.006:1.0.

As another variation referring to methods one to five, errors that may be introduced by optionally scaling the luminance image are reduced by utilizing floating point numbers during the chrominance/luminance separation steps. In such case, the original HDR image is in floating point format and the separated HDR luminance image is represented in the same floating point precision.

With regard to optionally sub-sampling the image, as mentioned herein, sub-sampling pertains to reducing the original image size or its resolution by 0.5, 0.25, 0.125, etc., or other appropriate step. Thus, the present invention does not encompass any size restriction with respect to sub-sampling. Moreover, as discussed above, sub-sampling may be applied in each of the embodiments described above. For example, in the first embodiment, the CC-texture 103 may be sub-sampled, with the ID-texture 104 generated at any size and resolution; in the second embodiment, the chrominance frame sequence 202 may be sub-sampled; in the third embodiment, the chrominance frame sequence 202 may be sub-sampled; in the fourth embodiment, the chrominance 202 and FL-frame 601 sequences may be sub-sampled; and in the fifth embodiment, the FC-frame 801 sequence may be sub-sampled.

As described herein, various embodiments of the present invention have been described. These embodiments may be applied to a 3D environment, if desired. The second through fifth embodiments described herein may be employed with or without the processes described in the first embodiment.

The present invention may be applied in various manners. In particular, the present invention may be employed in, but not limited to, the following: (1) real-time or pre-computed (software) 3D applications; (2) static or dynamic (animated) 2D image applications: (3) hardware/physical implementations (electronic, mechanical, optical, chemical etc.); and (4) hardware/software display devices applications and engineering.

As discussed herein, the present invention entails at least the following advantageous features, as compared to many prior art systems/processes/techniques: fewer possible number of operations during encoding and decoding; smaller output file size (i.e., greater compression ratio); fewer errors introduced; and easier engineering (i.e., less complex system).

in addition, the present invention does not rely on a specific type of compression algorithm/technique, such as MPEG, but rather employs any of a variety of compression algorithms/techniques and thus is completely compatible with existing compression algorithms. On the other hand, most prior art systems are designed around specific tone mapping algorithms or ad-hoc solutions which are not sufficiently generalized in order to satisfactorily meet the needs of standardized procedures in film-making and video editing processing, including brightness and contrast adjustments, etc. Thus, the present invention provides for at least the following advantageous aspects/features; backward compatibility with existing compression techniques; backward compatibility with existing video editing procedures;

output data that is as compression-friendly as possible; output data that is editable in real-time; and other features mentioned above.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

I claim:

1. A method for processing image or video data comprising:
    receiving as input an image or video;
    separating the image or video data into a luma image or video data and a chroma image or video data;
    storing the luma image or video data and chroma image or video data in corresponding separate spaces in memory;
    separately compressing the luma image or video data and chroma image or video data; and
    scaling the luma image or video data before compressing.

2. The method of claim 1, wherein the input image or video can range from an 8-bit per color channel to a 32-bit per color channel image or video data.

3. The method of claim 1, wherein the input image or video comprises either an LDR or an HDR image or video.

4. A method for processing image or video data comprising:
    receiving as input an image or video;
    separating the image or video data into a luma image or video data and a chroma image or video data;
    storing the luma image or video data and chroma image or video data in corresponding separate spaces in memory; and
    separately compressing the luma image or video data and chroma image or video data,
    wherein the input image or video comprises either an LDR or an HDR image or video,
    wherein the input image or video comprises a luma HDR image or video, further comprising scaling and gamma correcting the luma HDR image or video before compressing the data.

5. A method for processing image or video data comprising:
    receiving as input an image or video;
    separating the image or video data into a luma image or video data and a chroma image or video data;
    storing the luma image or video data and chroma image or video data in corresponding separate spaces in memory; and
    separately compressing the luma image or video data and chroma image or video data,
    wherein the input image or video comprises either an LDR or an HDR image or video,
    wherein the input image or video comprises a luma HDR image or video, further comprising:
    clamping or tone mapping the luma HDR image or video image in a range between 0 and 1 (LDR_lum); and
    computing a luma ratio between an LDR_lum and a luma HDR (LDR_lum/HDR_lum), followed by scaling the ratio between [0 and 1] and gamma correcting both LDR_lum and the luma ratio before compressing the LDR_lum and the luma ratio.

6. The method of claim 1, wherein the compressed image or video data is a standard encoding system format.

7. The method of claim 6 wherein the standard encoding format is JPEG, MPEG, JPEG-2000, AVI, TIFF, HEVC, BMP, GIF, or ZIP.

8. The method of claim 1, wherein an RGB CL-index is created and stored in metadata of a chosen encoding system format.

9. The method of claim 1, wherein the luma and chroma input image or video data is either a floating point or an integer value.

10. A method for decoding an image or video comprising encoded data, the method comprising:
    decoding the encoded data into luma and chroma image or video; and
    reconstructing the image or video based on the luma and the chroma decoded data,
    wherein an RGB CL-index is stored in metadata of the encoded data and, wherein the RGB CL-index is extracted from the metadata.

11. The method of claim 10, wherein the method uses a dot product between the luma image or video and the RGB CL-index to reconstruct pre-luma values, following which the pre-luma values are re-scaled to reconstruct the luma values of the reconstructed image or video.

12. A method for decoding an image or video comprising:
    decoding coded image or video comprising luma, chroma and fractional luma data;
    reconstructing the image or video based on luma, chroma and fractional luma data; and
    rescaling, inverting and gamma correcting the luma and fractional luma data prior to reconstructing luma values of the reconstructed image or video.

13. The method of claim 10, wherein the encoded image or video data is decoded with standard decoders.

14. A method for processing image or video data comprising:
    receiving as input an image or video;
    separating the image or video data into a luma image or video data and a chroma image or video data;
    storing the luma image or video data and chroma image or video data in corresponding separate spaces in memory; and
    separately compressing the luma image or video data and chroma image or video data, wherein the input image or video can range from an 8-bit per color channel to a 32-bit per color channel image or video data, further comprising scaling the stored luma image or video data before compressing.

15. A method for processing image or video data comprising:
    receiving as input an image or video;
    separating the image or video data into a luma image or video data and a chroma image or video data;
    storing the luma image or video data and chroma image or video data in corresponding separate spaces in memory; and
    separately compressing the luma image or video data and chroma image or video data, wherein the input image or video comprises either an LDR or an HDR image or video, wherein the input image or video comprises a luma HDR image or video and wherein the compressed image or video data is a standard encoding system format, further comprising:

clamping or tone mapping the luma HDR image or video image in a range between 0 and 1 (LDR_lum); and computing a luma ratio between an LDR_lum and a luma HDR (LDR_lum/HDR_lum), followed by scaling the ratio between [0 and 1] and gamma correcting both LDR_lum and the luma ratio before compressing the LDR_lum and the luma ratio.

16. A method for processing image or video data comprising:

receiving as input an image or video;

separating the image or video data into a luma image or video data and a chroma image or video data;

storing the luma image or video data and chroma image or video data in corresponding separate spaces in memory; and separately compressing the luma image or video data and chroma image or video data, wherein the input image or video comprises either an LDR or an HDR image or video, wherein the input image or video comprises a luma HDR image or video and wherein the compressed image or video data is a standard encoding system format, further comprising:

clamping or tone mapping the luma HDR image or video image in a range between 0 and 1 (LDR_lum); and computing a luma ratio between an LDR_lum and a luma HDR (LDR_lum/HDR_lum), followed by scaling the ratio between [0 and 1] and gamma correcting both LDR lum_and the luma ratio before compressing the LDR_lum and the luma ratio, creating an RGB CL-index and storing it in metadata of the standard encoding system format.

* * * * *